US009282464B2

United States Patent
Deb et al.

(10) Patent No.: US 9,282,464 B2
(45) Date of Patent: Mar. 8, 2016

(54) QOS AWARE MULTI RADIO ACCESS POINT FOR OPERATION IN TV WHITESPACES

(75) Inventors: Supratim Deb, East Brunswick, NJ (US); Piyush Gupta, Bridgewater, NJ (US); Kanthi C N, Karnataka (IN); Vikram Srinivasan, Bangalore (IN)

(73) Assignee: Alcatel Lucent, Boulogne-Billancourt (FR)

( * ) Notice: Subject to any disclaimer, the term of this patent is extended or adjusted under 35 U.S.C. 154(b) by 228 days.

(21) Appl. No.: 14/110,612

(22) PCT Filed: Apr. 8, 2011

(86) PCT No.: PCT/IB2011/001043
§ 371 (c)(1),
(2), (4) Date: Dec. 16, 2013

(87) PCT Pub. No.: WO2012/137029
PCT Pub. Date: Oct. 11, 2012

(65) Prior Publication Data
US 2014/0112275 A1 Apr. 24, 2014

(51) Int. Cl.
*H04W 16/14* (2009.01)
*H04W 72/04* (2009.01)
*H04W 72/08* (2009.01)
*H04W 16/10* (2009.01)

(52) U.S. Cl.
CPC .......... *H04W 16/14* (2013.01); *H04W 72/0453* (2013.01); *H04W 72/085* (2013.01); *H04W 72/087* (2013.01); *H04W 16/10* (2013.01)

(58) Field of Classification Search
CPC .............. H04W 16/14; H04W 72/085; H04W 72/0453; H04W 72/087; H04W 16/10
See application file for complete search history.

(56) References Cited

U.S. PATENT DOCUMENTS

2007/0178840 A1  8/2007  Deguchi

FOREIGN PATENT DOCUMENTS

EP         1 641 187 A1    3/2006
WO    WO 2010/142021 A    12/2010

OTHER PUBLICATIONS

Hou et al., "Distributed Resource Allocation for Proportional Fairness in Multi-Band Wireless Systems," Feb. 13, 2011, Cornell University.*
Deb et al., "Dynamic Spectrum Access in DTV Whitespaces: Design Rules, Architecture and Algorithms," Sep. 25, 2009, ACM.*
(Continued)

*Primary Examiner* — Jae Y Lee
(74) *Attorney, Agent, or Firm* — Fay Sharpe LLP

(57) ABSTRACT

QoS aware multi radio access point for operation in TV whitespaces is disclosed. The present invention relates to operation of access points and, particularly, to operation of access points in TV whitespaces. The AP is configured to intelligently choose the radios, determine available whitespaces in the spectrum and allocate radios to the available whitespaces in the spectrum. The method determines clients that need to be serviced by the AP and assigns each client associated with AP to one of the radios. In addition, the method also takes care of QoS requirements for different services and hence every service is addressed to satisfy its QoS requirements. The method ensures that there is maximum utilization of available whitespace spectrum by accounting for the spectrum specific characteristics. The method considers bands for operation are spread across the spectrum and allocates the clients based on the availability of bands throughout the spectrum.

14 Claims, 8 Drawing Sheets

(56) References Cited

OTHER PUBLICATIONS

Hunag et al. "Joint Association and Power Adaption in WiFi Community Networks," Mar. 25, 2011, IEEE.*

Gupta et al. "An Agile and Efficient MAC for Wireless Access over TV Whitespaces," Jan. 2015, IEEE.*

Mohammed Zafar Ali Khan et al., "User Allocation for Tri-band Cognitive Cellular Networks," Cognitive Wireless Systems, IEEE, XP031921812, pp. 1-5, Dec. 13, 2010.

Hoyoung Choi et al., "Efficient Combining Scheme of Scheduling and Channel Allocation in Multi-Channel Systems," IEICE Transactions on Communications, vol. E90-B, No. 12, The Institute of Electronics, Information and Communication Engineers, XP001509860, pp. 3699-3703, Dec. 1, 2007.

International Search Report for PCT/IB2011/001043 dated Dec. 5, 2011.

Supratim, Deb, et al., "Dynamic Spectrum in DTV Whitespaces: Design Rules, Architecture and Algorithms", Proceedings of the 15th annual international conference on Mobile computing and networking, Beijing, China, Sep. 20-25, 2009, Copyright 2009, pp. 1-12.

* cited by examiner

QOS AWARE MULTI RADIO ACCESS POINT FOR OPERATION IN TV WHITESPACES

TECHNICAL FIELD

The present invention relates to operation of access points and, more particularly, to operation of access points in TV whitespaces.

BACKGROUND

Demand for broadband services is exploding. Over the past few years variety of communication devices have been connected to the internet for a variety of services. Further, with new services being offered over wireless communications the requirement of the spectrum for the services is increasing. As a result, attempts have been made to exploit the unused part of the licensed spectrum. This unused part of the spectrum is referred to as TV whitespace. Since the whitespace part of the spectrum lies in the frequency range from 50-698 MHz in US and is spread over 470-790 MHz in UK, the spectrum may be utilized for various wireless services offered to the subscribers.

Existing communication mechanisms have developed various services that employ the whitespace spectrum for communication. One of the services includes a wireless access point that operates over the whitespace spectrum. However, existing access points have their own limitations. For example, these access points do not have mechanisms to intelligently choose the available whitespace and allocate clients to the whitespaces. Further, the access points do not account for spectrum specific characteristics. This is because present allocation mechanisms assume that the spectrum is homogenous in nature and hence allocation is concentrated to one part of the spectrum. Such assumptions are good only in cases where the total range of the available spectrum is not so diverse. However, in most of the cases allocation is not concentrated to a region or band within the spectrum but it is distributed through the available spectrum. Further, these mechanisms do not take into consideration the heterogeneous nature of the spectrum and the availability of the bands through the spectrum. As a result, most of the times all the available bands in the spectrum are not exploited and the allocation becomes concentrated to only the explored part of the spectrum. Thus, whitespace selection that ignores frequency dependent propagation cannot take the benefits provided by lower frequency bands and thus resulting in inefficient spectrum allocation.

In turn, present day access points do not have efficient client location identification means as a result of which the choice of whitespaces for the clients is not done appropriately. For example, data rate of transmission per unit of the bandwidth can be higher if the clients are located close to the access points as compared to the clients who are located far from the access points. In addition, the factors such as if the client is located close to the edge of the coverage area and so on need to be considered. Whereas, these factors have not been taken into consideration in present day access points and hence there is no efficient utilization of the whitespace.

Also, existing access points assume that wireless systems possess single rate whereas the wireless systems these days are multi rate and support adaptive modulation and coding mechanisms. In other words, a client with better signal strength gets better data rate and a client with poor signal strength gets poor data rate. Existing access points assume that client data rates are independent of the signal strength and the data rate is achievable if the client is located within some specified range of the access point.

Further, existing access points have limited radio and the fact that the spectrum is diverse necessities multiple radio in order to serve multiple clients. Some work has been done on implementing multiple radio based solutions for channel allocation however; none of the existing mechanisms work on spectrum allocation explicitly for multi radio based architecture. In addition, the single radio based solutions in existing access points are not extensible to a multi radio solution.

Also, existing mechanisms do not take into consideration the QoS requirements for different services. Thus, the access point does not serve users based on their QoS requirements.

In addition, some of the existing solutions provide for spectrum planning in enterprise wireless LAN. However, these solutions employ a central controller to know the interference maps of the access points in the enterprise setting; they also need to determine the number of clients associated with each access point. In case of an uncoordinated deployment such information would not be available. Due to the aforementioned drawbacks existing access points are not effective in serving the clients and utilizing the bandwidth effectively.

SUMMARY

In view of the foregoing, an embodiment herein provides an access point for allocation of bands in television whitespace spectrum to clients. The access point comprises a middleware quality of service handling module comprising a television whitespace selection and client assignment engine. The engine is configured for determining the number of radios for the access point that can be selected for operation, choosing available television whitespace spectrum that correspond to the radios and assigning the clients to the radios by ensuring there is weighted proportional fair data rate allocation for the radios. A decision module is configured for obtaining input from a weighted proportional fair medium access control module and invoking the television whitespace selection and client assignment engine to change the client assignment if required. In the access point the clients are assigned to the radios based on weighted proportional fair data rates where the weights are chosen to reflect the quality of service requirements for the clients. The access point further comprises a client measurement and allocation engine that is configured for obtaining the location and signal strengths of the clients. The access point further comprises the weighted proportional fair medium access control module that delivers weights for the clients based on the quality of service requirements for the services of the clients. The access point is further configured to perform reassignment of the clients if there is a positive change in moving the clients to a second band. In the access point the weights are assigned based on factors that include at least one of client location, signal strengths over different bands and quality of service requirements. The access point selects the whitespace and the clients based on uncoordinated deployment and pure client strategy. The access point further selects the whitespace and the clients based on uncoordinated deployment and mixed client strategy.

Embodiments further disclose a method for allocation of clients of an access point to television whitespace spectrum. The method comprises the access point determining the signal strength for a client that joins the access point, the access point instructing the client to join best bands available in the television whitespace spectrum based on the signal strength for the client, the access point determining if the quality of service requirements for the client changes more than a threshold value since previous allocation, the access point performing a new client assignment if the quality of service requirements for the client changes more than a threshold value and the access point broadcasting the allocation details. The method further performs signal strength measurements for the clients on one of periodic, event basis. The method further keeps track of client departures and reallocates the clients if required.

Embodiments herein also disclose method for assignment of clients to frequency bands in the television whitespace spectrum. The method comprises determining the frequency bands in the television whitespace spectrum that corresponds to non zero data rates, assigning the clients to the frequency bands, determining the best frequency band for operation for a new client, checking if there is a positive improvement in moving the new client to the best frequency band and moving the new client to the best frequency band if there is positive improvement. The method checks for the positive improvement, where the positive improvement is decided based on at least one of change in proportional fairness metric due to moving the client to another frequency band, decrease in metric for the clients already in the frequency band and increase in metric due to the client being removed from the initial frequency band. The method further determines the best frequency bands for allocation to the clients based on the best total log utility of the bands.

These and other aspects of the embodiments herein will be better appreciated and understood when considered in conjunction with the following description and the accompanying drawings.

BRIEF DESCRIPTION OF THE FIGURES

The embodiments herein will be better understood from the following detailed description with reference to the drawings, in which.

DETAILED DESCRIPTION OF EMBODIMENTS

Figure 1:
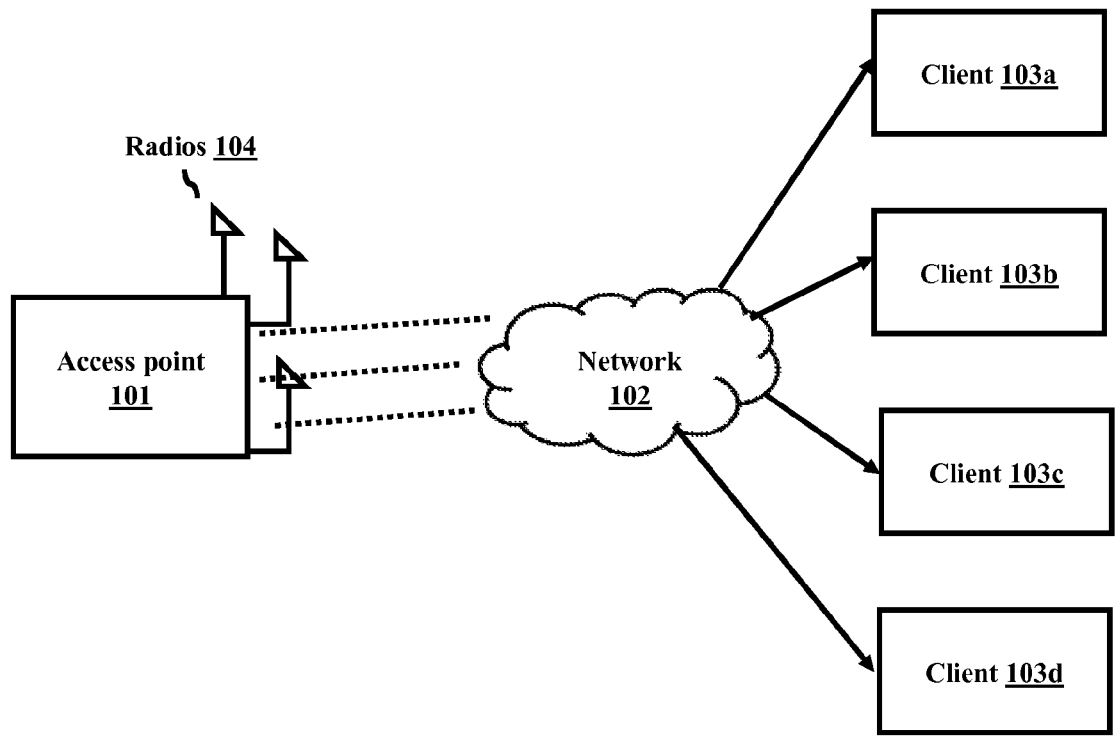
FIG. 1 illustrates the network diagram of an access point serving multiple clients, according to an embodiment as herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein disclose a method and architecture of an access point that takes into consideration the QoS requirements for different services and accordingly allocates the TV whitespace spectrum to the clients. Referring now to the drawings, and more particularly to FIGS. 1 through 8, where similar reference characters denote corresponding features consistently throughout the figures, there are shown embodiments.

Architecture for the operation of a Wireless Access Point (AP) is disclosed. The proposed architecture employs a system and method for the operation of the AP. The method further employs algorithms for the operation of the AP. The AP is configured to intelligently choose the radios for its operation then determine the available TV whitespaces in the spectrum and allocate the radios to the available TV whitespaces in the spectrum. The method then determines the clients that need to be serviced by the AP and assigns each client associated with the AP to one of the radios. In addition, the method also takes care of the QoS requirements for different services and hence every service is addressed to satisfy its QoS requirements. The method ensures that there is maximum utilization of the available TV whitespace spectrum by accounting for the spectrum specific characteristics. The method takes into consideration that the bands for operation are spread across the spectrum and hence allocates the clients based on the availability of the bands throughout the spectrum. This form of frequency dependent propagation ensures that the benefits provided by the lower frequency bands in exploited resulting in efficient spectrum utilization.

FIG. 1 illustrates the network diagram of an access point serving multiple clients, according to an embodiment as herein. As depicted the architecture of the AP is designed such that it may service multiple clients for different services. The AP 101 is a wireless AP that services clients who are in its vicinity of operation. The AP 101 connects to clients 103*a*, 103*b*, 103*c* and 103*d* through the network 102. In an embodiment, the network may be a wireless network, wired network, Local Area Network (LAN) and so on. The AP 101 comprises of radios that enable detection of the clients and establishes connection with the clients through the network 102.

At first, the AP 101 determines the radios that are available for serving the clients. In this example, consider there are three radios available for service. The AP 101 selects the three radios. Then it determines the bands in the TV whitespace spectrum that may be employed for serving the clients using the three radios. The bands may be distributed at different parts of the spectrum. Further, the bands available are selected. The AP 101 then determines the clients 103 who are available in its vicinity. For example, clients 103*a*, 103*b*, 103*c* and 103*d* may be available in its vicinity. The AP 101 determines the type of service requirements for the clients 103. From the service requirements the QoS requirements for the services is determined. Based on the QoS requirements the clients are assigned bands in the spectrum. In another embodiment, the AP may be configured to perform a check at regular intervals (the intervals may be predefined) to see if the QoS requirements deviate from the threshold values and if it deviates the AP 101 may perform reassignment of the bands in the spectrum. In an embodiment, reassignment is performed under two conditions: if there is a positive improvement to the client by such an assignment and if other existing clients are not affected by such an assignment. As a result, the method ensures that the clients 103 are allocated bands within the spectrum to service their requirements.

Figure 2:
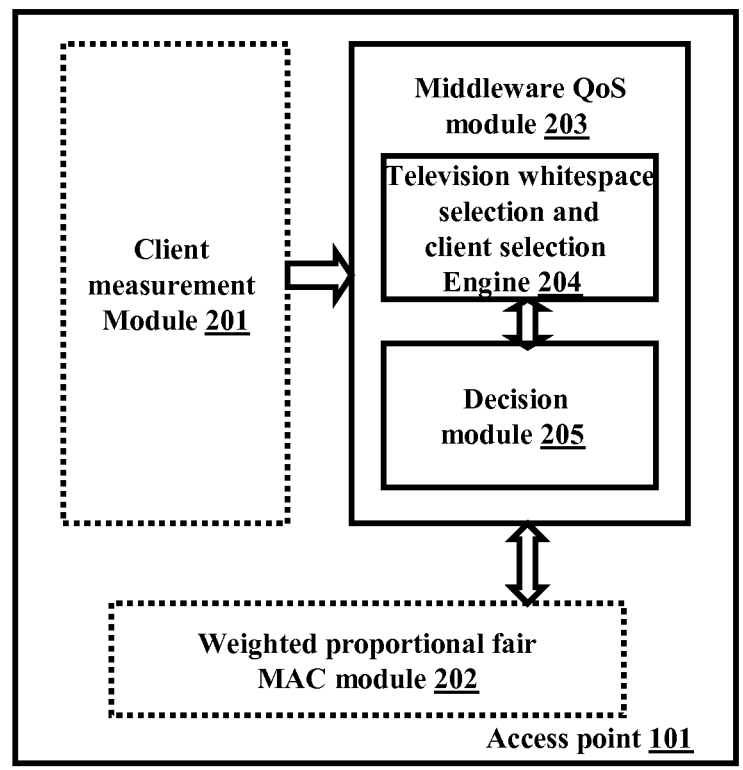
FIG. 2 illustrates the architecture of the access point, according to an embodiment as herein.

FIG. 2 illustrates the architecture of the access point, according to an embodiment as herein. The AP 101 comprises of several modules that reside within it that include a client measurement module 201, weighted proportional fair MAC module 202, a middleware QoS module 203. The middleware QoS module 203 further comprises of a whitespace selection and client selection engine 204 and a decision module 205. The modules are interfaced with each other in order to support the functionality of the AP 101.

The client measurement module 201 is responsible for keeping track of the activities of the clients 103. The activities include client 103 measurements in different bands, signal strengths, QoS requirements for different client services and the like. The client measurement module 201 records the number of clients allocated in different bands. When a new client enters in the service area of the AP 101, the client measurement module 201 records the signal strengths of the client and also keeps a track of periodic signal strengths of the clients. In case there is change in the signal strengths or QoS of the clients the client measurement module 201 informs the same to the middleware module 203. In addition, the client measurement module also records the location of the clients to allocate the clients in appropriate bands.

The weighted proportional fair medium access control (MAC) module 202 is responsible for ensuring proportional fairness in allocation of the bands to the clients. For this purpose, the MAC module 202 interacts with the client measurement module 201 to determine the signal strengths and location data of the clients 103 and then the allocation is done.

The middleware QoS module 203 is the key component of the AP 101. The middleware QoS module 203 employs the whitespace selection and client selection engine 204 and a decision module 205 in order to perform client allocation in different bands. The television whitespace selection and client selection engine 204 intelligently chooses the television whitespaces corresponding to each radio of the AP 101, assigns different clients 103 to the radios, and for each radio ensures that the MAC delivers weighted proportional fair data rates. In an embodiment, for fair allocation weights are assigned to the services for their QoS. Further, based on the services and the requirements of the QoS for the services, weights are assigned to the services. In an example, a VOIP service may have a higher weight as compared to an audio service. Based on the priorities of the QoS for the services the allocation is done. The television whitespace selection and client selection engine 204 then instructs the decision module 205 to perform the TV whitespace selection and client assignment.

The decision module 205 is responsible for taking inputs from the TV whitespace selection and client selection engine 204 and taking decision accordingly. The decision module 205 decides when to invoke the whitespace selection and perform the client assignment. It also takes decision as to when the allocation of clients should be changed if required. The decision module 205 ensures that the clients do not have to change their band far too frequently. In case there are substantial gains to be had by altering their bands then it is performed.

In an embodiment, the middleware QoS module 203 may take care of both the hard QoS and soft QoS requirements for a service. In case of soft QoS for a service the QoS required depends on the type of application for which the service is employed and there is absolute no guarantee of the QoS. On the other hand, in case of hard QoS the QoS requirements of the QoS for each service is more or less fixed and does not vary with the application.

Figure 3:
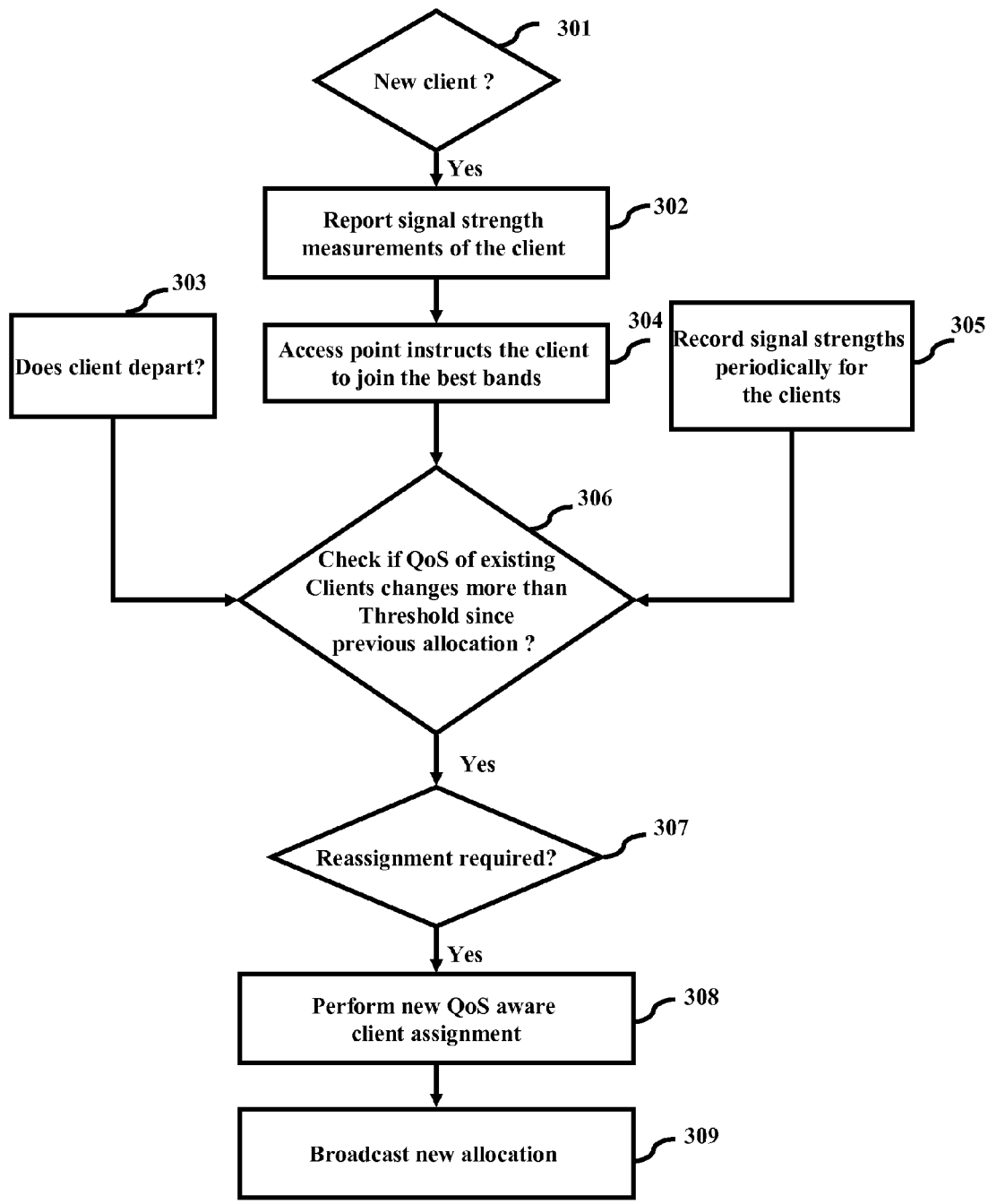
FIG. 3 is a flow diagram depicting the access point functional process, according to an embodiment as herein.

FIG. 3 is a flow diagram depicting the access point functional process, according to an embodiment as herein. The AP 101 is involved in determining the clients in the vicinity and allocation of the bands in the spectrum for the clients 103 based on the QoS requirements for the clients. When a new client 103 comes in the vicinity of the AP 101, the AP 101 makes a check (301) if the client is within its service area. If the client 103 is a new client the AP 101 records the signal strength measurements and reports (302) the same. Based on the report, the AP 101 determines which band is best suited for the client 103 and instructs (304) the client 103 to join the band that is best suited for its QoS requirements. Meanwhile, the AP 101 also keeps track (303) of any clients who are moving out of the coverage area of the AP 101. In addition, the AP 101 periodically records (305) the signal strengths of the clients 103 to determine if there are any changes in the signal strength. In an embodiment, the signal strength may also be measured on event basis i.e., when an event is triggered by the client 103 and so on. Based on all these outputs, the AP 101 makes a check (306) if the QoS requirements of the allocated clients 103 change more than the limited threshold since the previous allocation is done. In an embodiment, the threshold value may be predefined. If there is a change in the QoS value from the defined threshold value then a check is made (307) if reassignment for the bands is required for the clients 103. In case reassignment is required, the AP 101 performs (308) new QoS aware client assignment. In this new assignment clients are reassigned bands in the whitespace spectrum based on their varying QoS requirements. Further, the new allocation scheme is broadcasted (309) to the clients 103. The various actions in method 300 may be performed in the order presented, in a different order or simultaneously. Further, in some embodiments, some actions listed in FIG. 3 may be omitted.

Figure 4:
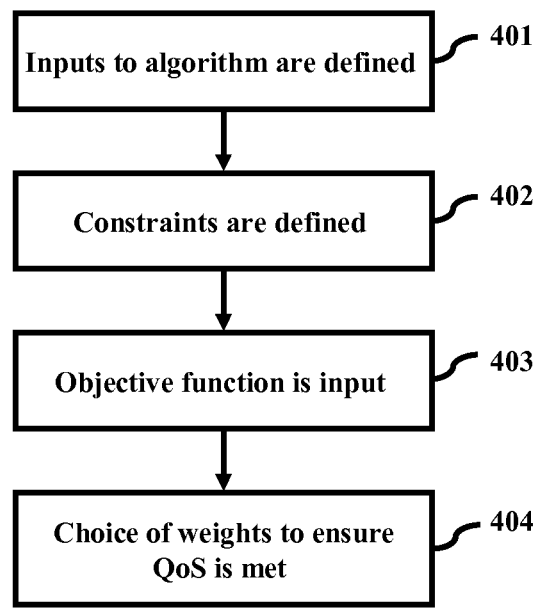
FIG. 4 is a flow diagram depicting initialization of the algorithm, according to an embodiment as herein.

FIG. 4 is a flow diagram depicting initialization of the algorithm, according to an embodiment as herein. Proposed algorithm uses strategies for coupled problem of TV whitespace selection and client assignment. The strategy space for the client is to operate over a particular whitespace, till further reallocation of the bands and client is performed. The approach has advantages as it involves low overhead if reallocation is not performed frequently.

Assumptions for the algorithm are as follows: the AP 101 is assumed to have K number of radios for operation. The whitespace available in 'M' TV and the required bands for K radios is K number. Further, it is important to note that the width of the bands may be 6 MHz or more, but not more than the maximum operating bandwidth of the radio. The clients 103 are then assigned to one of the K bands so as to maximize a suitable objective. Further, each band that a radio chooses can consist of multiple TV channels as long as the spectrum spanned by these multiple TV channels is no more than the tunable bandwidth of the radio.

The inputs to the algorithm are then defined (401). During this process the allocation accounts for the data transmission rate per Hz (referred to as RPH hereafter) a client 103 can get from frequency band that is defined as j. Further, the client i's rate per Hz in band j is denoted by $\eta_{ij}$. The parameter $\eta_{ij}$ is product of spectral efficiency over the band and occupancy time the band is perceived free by the client 103. In case, the $\eta_{ij}$'s are different for uplink and downlink traffic, we can either take the one corresponding to downlink scenario since downlink traffic is dominant, or we can take a weighted average with more weight for the downlink RPH. Note that, $\eta_{ij}$ can be zero for various bands, for e.g. bands where wireless microphone is present.

In the next step constraints are defined (402). There an assumption is made that every client 103 perceives non-zero RPH in at least one frequency band. There are two constraints: the first states that every client 103 should be assigned to some band, and no client 103 can be assigned to more than one band. The second constraint follows from the fact that each client 103 has one radio for communication purpose.

The objective function is then defined (403). The choice of objective function should reflect QoS as well as efficient system utilization. For this end, weighted proportional fairness is employed which has been used successfully in EV-DO, GPRS and many other cellular systems. In an embodiment, in the proportional fairness the system tries to maximize $\Sigma_i \, w_i \, \log(R_i)$ where Ri is the average rate that client-I receives and $w_I$ are weights for clients that reflect QoS guarantees. Roughly speaking, in proportional fairness, every client gets a rate that is proportional to the "channels" and their weights.

The weights are then chosen (404) to ensure the QoS requirements are met accordingly. The chosen weights essentially determine QoS classes and it is only the relative weights that matter. If two clients 103a, 103b are assigned weights 1 and 2, it essentially means that, if all things (location, signal strengths, available bands) are equal then one client 103b will get twice the data rate as the other under weighted proportional fairness. In an embodiment, to choose weights the following is performed i) Divide the QoS space into a small number of QoS classes, ii) prioritize the QoS classes to iii) Assign higher weights to high-priority QoS classes in a manner such that the relative weights reflect the relative priorities. Further note that if all weights are equal, then we guarantee simply proportional-fair data rates as in 3G/EV-DO.

Figure 5:
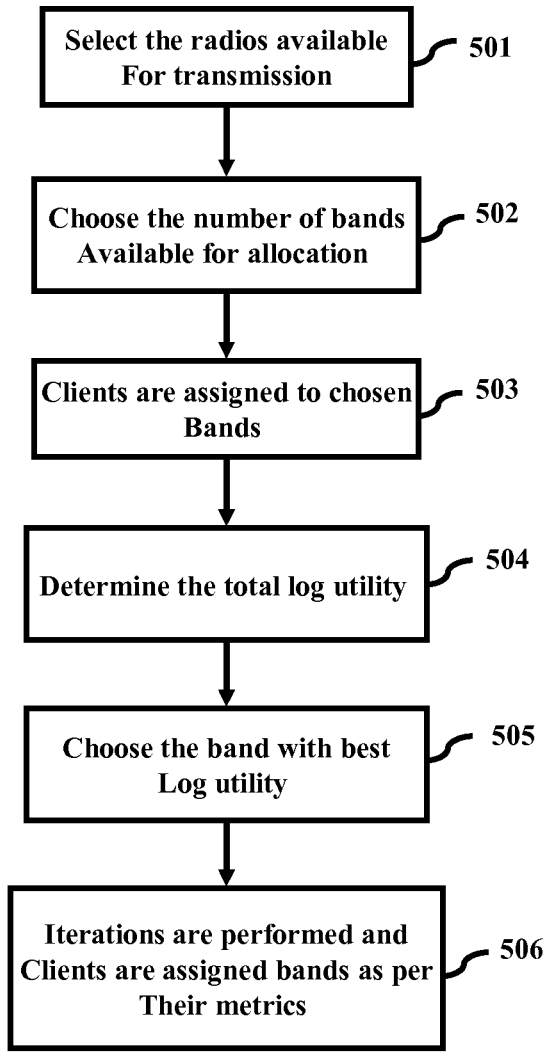
FIG. 5 is a flow diagram depicting the process of selecting radios for clients, according to an embodiment as herein.

FIG. 5 is a flow diagram depicting the process of selecting radios for clients, according to an embodiment as herein. In an embodiment herein the algorithm is presented for small values of K, where K is the number of radios. This algorithm is polynomial in the number of clients and frequency bands but exponential in K. Later, we extend this algorithm to develop a heuristic that is polynomial in K. Developing an algorithm for small K has three benefits. Firstly, in many practical scenarios, we envision that typical values of K will be less than three or four. Secondly, given that the general problem is as hard as set-cover, which is among the more difficult NP-hard problems (in the sense, it does not have any known algorithm with constant factor approximation guarantee); developing algorithm with provable guarantees can be expected only in restricted regimes. Finally, note that, the problem here has two important ingredients: choosing a set of K frequency bands, and assigning the clients optimally to the chosen bands. Clearly, these two components of the algorithm are dependent on each other. The proposed algorithm for small values of K tackles the problem of assigning clients optimally to a given set of frequency bands chosen by an AP 101.

At first the radios that are available for transmission are selected (501). The number of bands that are available for allocation in the TV whitespace spectrum are selected (502). The clients 103 that may be serviced in the chosen bands are selected and the clients 103 are assigned (503) optimally to the chosen K bands. Further, the total log utility is obtained (504). This process of obtaining log utility may be performed for clients 103 that get non zero data rate in some frequency band among the K bands being tried. Among all possible choices of K bands (there are $O(M^K)$ choices) where every client 103 gets non-zero data rate in some band, the bandwidth the best log utility is chosen (505). Further, the band with the best log utility is chosen (506). Several iterations are performed (507) and clients 103 are assigned bands as per their metrics. The method thus ensures that maximum proportional fairness is achieved for client 103.

Optimal assignment of the clients to K bands is done. Consider a simple algorithm for client assignment assuming that for every client, there is a band where it can transmit at a non-zero data rate to the AP. Suppose, an AP has chosen F bands denoted by the set F; the set F will denote the index of frequency bands under consideration (the set of all frequency bands may be B1; B2, . . . ; BM. Here F is the number of bands under consideration). Suppose the data rate that client-i achieves if it is the only client in band-j is $r_{ij}$. The algorithm relies on the following important fact. If N clients are assigned to a frequency band Bj with total weights of the clients W, then, under proportional fairness, the data rate that client-i should get is $r_{ij}/W$.

Figure 6:
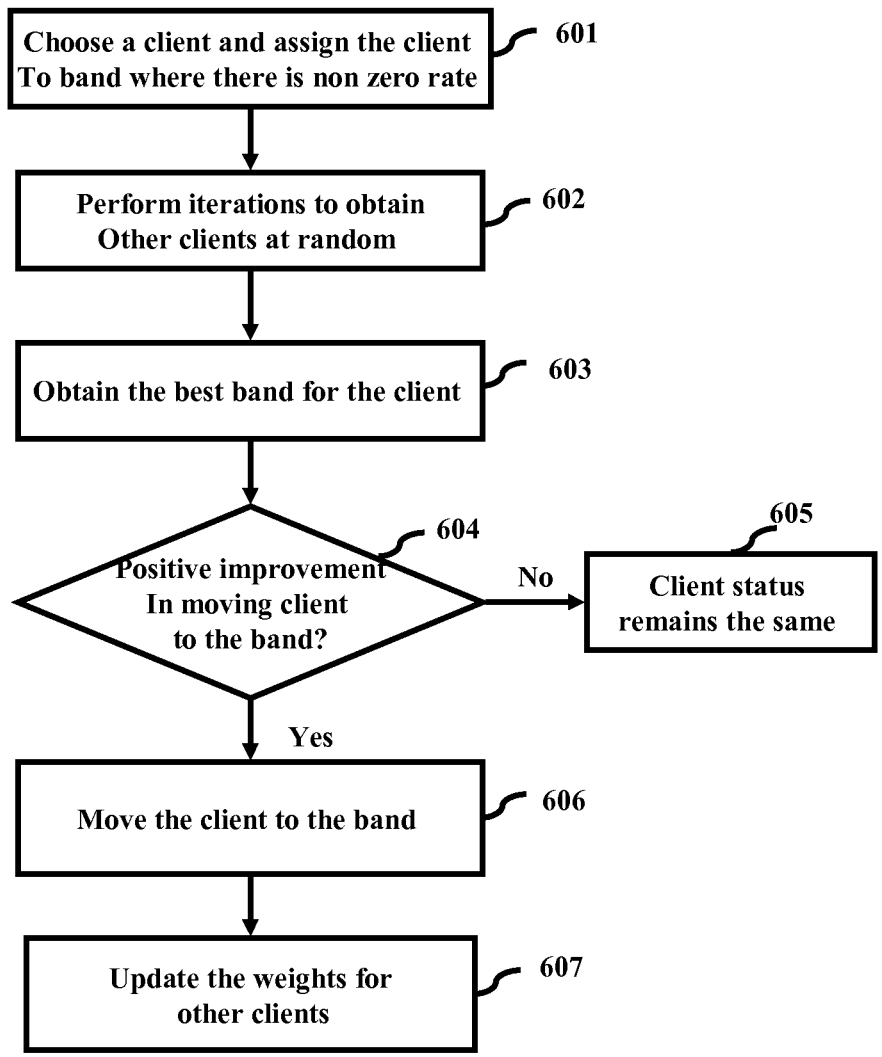
FIG. 6 is a flow diagram depicting client assignment algorithm, according to an embodiment as herein.

FIG. 6 is a flow diagram depicting client assignment algorithm, according to an embodiment as herein. At the first step in the algorithm, initialization is performed. Every client is assigned (601) to a band where the client gets non zero data rate per Hz. In the next step iterations are performed (602) in order to obtain other clients at random. The best bands that are suitable for the chosen clients are determined (603). Further, a check is made (604) if there is a positive improvement is moving the client to the best bands selected for the client. In an embodiment, positive improvement may mean if there is a change in the weighted proportional fairness, decrease in the metric for other clients and so on. If there is no positive improvement in moving the client then the client may be retained (605) in the same band. On the other hand, if there is a positive improvement in moving the client then the client is moved (606) to the band. Further, weights for other clients are updated (607) if there is any change and the process is repeated. The various actions in method 600 may be performed in the order presented, in a different order or simultaneously. Further, in some embodiments, some actions listed in FIG. 6 may be omitted.

The algorithm is depicted below:

---

Algorithm 1 Client Assign(F, C): Assignment of clients in C to frequency bands F.

1: Initialization: Assign every client to a band where it gets non-zero data rate-per-Hz. Let $C_j$ be the clients assigned to frequency band j and let $W_j = \Sigma_{i \in C_j} w_i$.

2: Let AC be the set of clients AC for which client assignment is still to be performed. Initially AC = C the set of clients.

3: while AC ≠ 0 do

4: Pick a client randomly from set AC. Let the index of this client be i. Denote by $l \in B$ the band where i is assigned in the initialization step.

5: Find the band where client i should be moved so as to give maximum improvement in the weighted proportional fairness metric. I.e., find band $j_i$ as follows:

$$j_i = \arg\max_{j \in F} \left[ \ln\left(\frac{r_{ij}}{w_i + W_j}\right) - \ln\left(\frac{r_{il}}{W_l}\right) - W_j \ln\left(1 + \frac{w_i}{W_j}\right) - (W_l - w_i)\ln\left(1 - \frac{w_i}{W_l}\right) \right]^+ \quad (1)$$

6: If the argument for $j_i$ is zero, then leave the assignment as it is, update AC as AC ← AC \ i, and move to the next iteration of the while loop in Step 4. In this case $j_i = l$.

-continued

```
7:    If the argument for j_i is non-zero, assign the band j_i to
      client i and perform the following updates.
         C_{j_i} ← C_{j_i} ∪ {i}
         C_l ← C_l \ {i}
      Increase W_{j_i} by w_i and decrease W_l by w_i.
8:    AC ← AC \ i
9:    end while
10:   The data rate for client i is d_i = r_{ij_i}/N_{j_i} and total utility is
      Σ_i ln d_i. Return the total utility, and client assignment j_i's.
```

First is the initialization step (Step 1) where every client is moved to a band where it can get non-zero data rate. Next is the greedy iteration (while loop) step. In each step of the iteration, one of the remaining clients is picked at random (Step 4), its best band is obtained (Step 5), and the client is moved to that band if there is positive improvement in the objective by moving the client to that band (Step 6-7). Step 4, where we decide the best band for the client under consideration, can be explained as follows. Note that the argument inside Equation. (1) has four terms, the first two terms quantify the change in the weighted proportional fairness metric due to moving client to band j, the second term is the decrease in the metric for all clients already in band j, and the last term is the increase in the metric due to client i being removed from the initial band. The increase and decrease in the proportional fairness metric follows from Fact1.

In an embodiment, an algorithm for generic K radios is depicted below. The previous algorithm has complexity $O(M^K)$. The proposed algorithm is not exponential in K. The algorithm incrementally chooses the bands 'r' at a time till K bands are chosen. The parameter 'r' can be chosen to trade off complexity and performance. The algorithm has the following steps. Initially all the bands are possible options for the choice of K bands. Then, all possible sets of r≤K bands are fed as input to client assignments Algorithm 1, and the set of bands which increases the log-utility most is chosen. These best set of r possible bands is included in the set of bands to be operated on. The previous step is repeated till K bands are chosen or till all bands are exhausted.

In an embodiment, the AP 101 assigns clients to the whitespaces in the spectrum based on factors like client locations, signal strengths over different bands and the QoS requirements of the clients for different services.

In an embodiment, the AP 101 employs whitespace selection in uncoordinated deployment and pure client strategy. In this case, the whitespace selection and client assignment strategy gives fair data rates to different clients by pure assignment. In pure client assignment the association of a client to a particular radio is fixed.

In an embodiment, the AP 101 employs whitespace selection in uncoordinated deployment and pure client strategy. In this case, the whitespace selection and client assignment strategy gives fair data rates to different clients by mixed client assignment. In mixed client assignment the association of a client to a particular radio is mixed.

Figure 7:
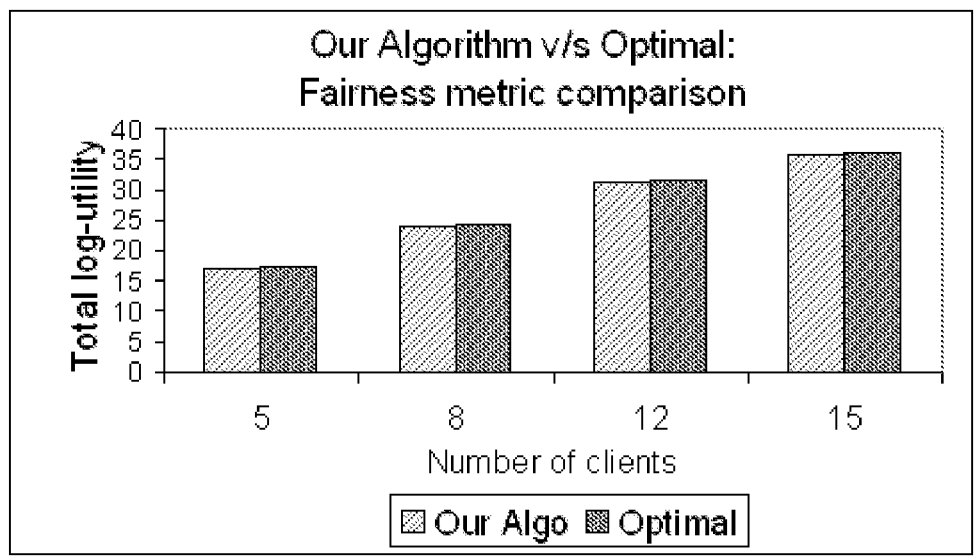
FIG. 7 is a graph depicting the comparison between the algorithm and fairness metric, according to an embodiment as herein.

FIG. 7 is a graph depicting the comparison between the algorithm and fairness metric, according to an embodiment as herein. In the graph a comparison of the proposed algorithm was done against optimal data rates for an AP in order to compare the fairness metric. The graph is a plot of the number of clients against the total log utility. For this purpose, radius was assumed to be 300 m and the path loss exponent was 3.0. The number of radios is 3 and the available whitespaces in the spectrum are 8. Further, the clients are located randomly in the coverage area and each result is averaged over multiple such runs. In an embodiment, the effect of wireless mike was also created to black out some TV channels. Further, the weights for the algorithm are chosen equally so as to guarantee far data rates among the clients. From the obtained results it is evident that the overall fairness metric or the total log utility of the proposed algorithm is close to the optimal value. In addition, the data rates achieved by the proposed algorithm are within 90% of that achieved by the optimal proportional fairness allocation.

Figure 8:
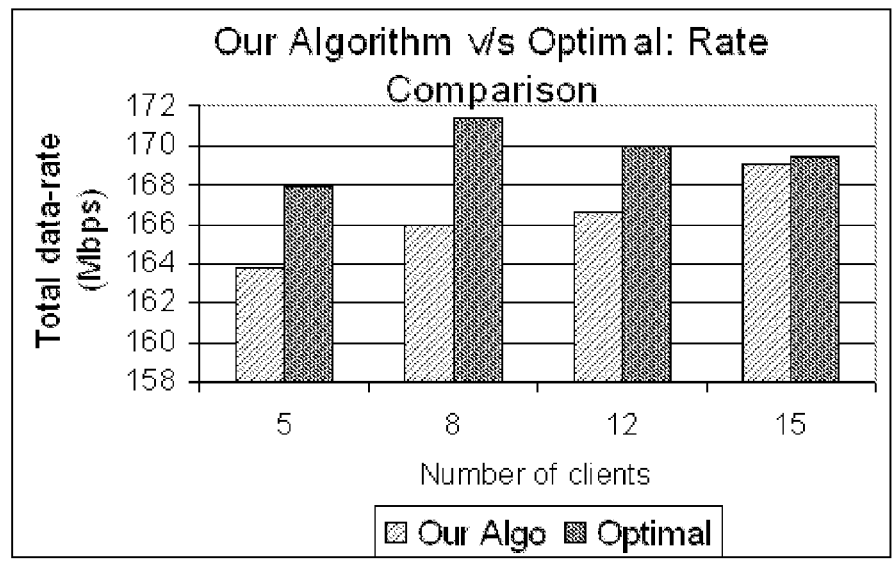
FIG. 8 is a graph depicting the comparison between the algorithm and rate comparison, according to an embodiment as herein.

FIG. 8 is a graph depicting the comparison between the algorithm and rate comparison, according to an embodiment as herein. In the graph a comparison of the proposed algorithm was done against optimal data rates for an AP to compare data rates. The graph is a plot of the number of clients against the total data rates. For this purpose, radius was assumed to be 300 m and the path loss exponent was 3.0. The number of radios is 3 and the available whitespaces in the spectrum are 8. Further, the clients are located randomly in the coverage area and each result is averaged over multiple such runs. In an embodiment, the effect of wireless mike was also created to black out some TV channels. Further, the weights for the algorithm are chosen equally so as to guarantee far data rates among the clients. From the obtained results it is evident that the overall fairness metric or the total log utility of the proposed algorithm is close to the optimal value. In addition, the data rates achieved by the proposed algorithm are within 90% of that achieved by the optimal proportional fairness allocation.

The advantages of the proposed algorithm are as follows: 1. QoS Classes: The solution is capable of providing differentiated services to different QoS classes. This could be very important as APs get deployed to deliver multimedia, voice, online games simultaneously. Indeed, potential applications of TV whitespace are home multimedia along with off-loading of LTE data from LTE phones. The solution helps to give priority to one traffic class over the other.

2. Spectrum specific characteristics (i.e., accounting for frequency dependent propagation). It is well known from the laws of physics that wireless signals incur much less path loss over a lower frequency band and thus propagates further. Hence, 100-106 MHz will result in a higher data rate compared to 500-506 MHz, provided the ambient interference experienced in both the bands is around the same level. The solution exploits this fact while selecting whitespaces and assigning clients to one of the radios.

3. Client location: Unlike any solution that extends 802.11 directly to TV whitespaces, our work explicitly accounts for the location of the clients with respect to the AP, thus squeezing out much more of the available whitespaces.

4. Multiple radios: The fact that the spectrum is fragmented necessitates multi-radio based solution. Most previous works do not account for multi-radio architecture. The architecture and algorithm explicitly accounts for multi-radio based architecture.

The embodiments disclosed herein can be implemented through at least one software program running on at least one hardware device and performing network management functions to control the network elements. The network elements shown in FIGS. 1 and 2 include blocks which can be at least one of a hardware device, or a combination of hardware device and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the claims as described herein.

What is claimed is:

1. An access point for allocation of bands in television whitespace spectrum to clients, said access point comprising:
    a processor, and
    a memory storing instructions that, when executed, cause the access point to:
    determine the number K of radios for said access point that can be selected for operation;
        choose K frequency bands from a set of M bands of available television whitespace spectrum that correspond to K said radios, wherein M>K; and
        assign said clients to said radios by ensuring there is weighted proportional fair data rate allocation for said radios, wherein a utility function used for said weighted proportional fair data rate allocation is maximized;
        obtain input from a weighted proportional fair medium access control module; and
        invoke said television whitespace selection and client assignment engine to change said client assignment if required.

2. The access point as in claim 1, wherein said clients are assigned to said radios based on weighted proportional fair data rates and said weights are chosen to reflect the quality of service requirements for said clients.

3. The access point as in claim 1, wherein said memory stores instructions that, when executed, cause the access point to obtain the location and signal strengths of said clients.

4. The access point as in claim 1, wherein said memory stores instructions that, when executed, cause the access point to deliver weights for said clients based on the quality of service requirements for the services of said clients.

5. The access point as in claim 1, wherein said memory stores instructions that, when executed, cause the access point to perform reassignment of said clients if there is a positive change in moving said clients to a second band.

6. The access point as in claim 1, wherein said weights are assigned based on factors that include at least one of client location, signal strengths over different bands and quality of service requirements.

7. The access point as in claim 1, wherein said access point selects said whitespace and said clients based on uncoordinated deployment and pure client strategy.

8. The access point as in claim 1, wherein said access point selects said whitespace and said clients based on uncoordinated deployment and mixed client strategy.

9. A method for allocation of clients of an access point to television whitespace spectrum, executed by said access point, said method comprising:
    determining a number K of radios for said access point that can be selected for operation;
    choosing K frequency bands from a set of M bands available television whitespace spectrum that corresponds to said K radios, wherein M>K, and assigning said clients to said radios by ensuring there is weighted proportional fair data rate allocation for said radios and a utility function used for said weighted proportional fair data rate allocation is maximized;
    said access point determining the signal strength for a client that joins said access point;
    said access point instructing said client to join best bands available in said television whitespace spectrum based on said signal strength for said client;
    said access point determining if the quality of service requirements for said client changes more than a threshold value since previous allocation;
    said access point performing a new client assignment if said quality of service requirements for said client changes more than a threshold value; and
    said access point broadcasting said allocation details.

10. The method as in claim 9, wherein said method further performs signal strength measurements for said clients on one of a periodic, or event basis.

11. The method as in claim 9, wherein said method further keeps track of client departures and reallocates said clients if required.

12. A method for assignment of clients to frequency bands in the television whitespace spectrum, said method comprising:
    determining a number K of radios for said access point that can be selected for operation;
    choosing K frequency bands from a set of M bands available television whitespace spectrum that corresponds to said K radios, wherein M>K, and assigning said clients to said radios by ensuring there is weighted proportional fair data rate allocation for said radios and a utility function used for said weighted proportional fair data rate allocation is maximized, wherein the frequency bands in said television whitespace spectrum correspond to non zero data rates;
    determining the best frequency band for operation for a new client;
    checking if there is a positive improvement in moving said new client to said best frequency band; and
    moving said new client to said best frequency band if there is positive improvement.

13. The method as in claim 12, wherein said method checks for said positive improvement, where said positive improvement is decided based on at least one of
    change in proportional fairness metric due to moving said client to another frequency band;
    decrease in metric for the clients already in said frequency band; and
    increase in metric due to said client being removed from said initial frequency band.

14. The method as in claim 12, wherein said method further determines said best frequency bands for allocation to said clients based on the best total log utility of said bands.

* * * * *